US007707305B2

(12) United States Patent
Afek et al.

(10) Patent No.: US 7,707,305 B2
(45) Date of Patent: Apr. 27, 2010

(54) METHODS AND APPARATUS FOR PROTECTING AGAINST OVERLOAD CONDITIONS ON NODES OF A DISTRIBUTED NETWORK

(75) Inventors: Yehuda Afek, Hod-HaSharon (IL); Anat Bremler-Barr, Holon (IL); Dan Touitou, Ramat-Gan (IL)

(73) Assignee: Cisco Technology, Inc., San Jose, CA (US)

( * ) Notice: Subject to any disclaimer, the term of this patent is extended or adjusted under 35 U.S.C. 154(b) by 2526 days.

(21) Appl. No.: 09/929,877

(22) Filed: Aug. 14, 2001

(65) Prior Publication Data

US 2002/0083175 A1 Jun. 27, 2002

Related U.S. Application Data

(60) Provisional application No. 60/240,899, filed on Oct. 17, 2000.

(51) Int. Cl.
*G06F 15/173* (2006.01)
(52) U.S. Cl. .................. 709/238; 709/235; 709/239
(58) Field of Classification Search ................ 709/225, 709/229, 239, 235, 238; 726/13, 22–25; 713/153, 154; 370/229–232, 235, 401, 469; 379/219, 220.01, 221.01, 221.02, 221.03
See application file for complete search history.

(56) References Cited

U.S. PATENT DOCUMENTS 5,067,074 A 11/1991 Farel et al. .................. 395/200
5,719,854 A * 2/1998 Choudhury et al. ......... 370/231

5,841,775 A 11/1998 Huang ........................ 370/422

(Continued)

FOREIGN PATENT DOCUMENTS

WO WO-99/48303 9/1999

(Continued)

OTHER PUBLICATIONS

Robert Stone, Center Track, An IP Overlay Network for Tracking Denial-of-Service Floods, MANOG17, Oct. 5, 1999, UUNET Technologies.

(Continued)

*Primary Examiner*—Frantz B Jean
(74) *Attorney, Agent, or Firm*—Nutter McClennen & Fish LLP; David J. Powsner; Joshua T. Matt

(57) ABSTRACT

Methods and apparatus for protecting against and/or responding to an overload condition at a node ("victim") in a distributed network divert traffic otherwise destined for the victim to one or more other nodes, which can filter the diverted traffic, passing a portion of it to the victim, and/or effect processing of one or more of the diverted packets on behalf of the victim. Diversion can be performed by one or more nodes (collectively, a "first set" of nodes) external to the victim. Filtering and/or effecting traffic processing can be performed by one or more nodes (collectively, a "second set" of nodes) also external to the victim. Those first and second sets can have zero, one or more nodes in common—or, put another way, they may wholly, partially or not overlap. The methods and apparatus have application in protecting nodes in a distributed network, such as the Internet, against distributed denial of service (DDoS) attacks.

39 Claims, 5 Drawing Sheets

U.S. PATENT DOCUMENTS

| | | | | |
|---|---|---|---|---|
| 5,991,881 | A * | 11/1999 | Conklin et al. | 726/22 |
| 6,005,926 | A | 12/1999 | Mashinsky | 379/114 |
| 6,314,463 | B1 | 11/2001 | Abbott et al. | 709/224 |
| 6,351,775 | B1 | 2/2002 | Yu | 709/238 |
| 6,829,654 | B1 * | 12/2004 | Jungck | 709/246 |
| 6,831,895 | B1 * | 12/2004 | Ji et al. | 370/237 |
| 6,880,090 | B1 * | 4/2005 | Shawcross | 726/14 |
| 6,901,053 | B1 * | 5/2005 | Davies | 370/237 |
| 2008/0016566 | A1 * | 1/2008 | Raz | 726/22 |

FOREIGN PATENT DOCUMENTS

WO     WO-02/25402     3/2002

OTHER PUBLICATIONS

Robert Stone, "Center Track: An IP Overlay Network for Tracking DoS Floods", Proceedings of the 9$^{th}$ USENIX Security Symposium, Denver, Colorado, USA, Aug. 14-17, 2000.

Bennett, J.C.R. et al. "Hierarchical Packet Fair Queueing Algorithms" IEEE/ACM Transactions on Networking (TON) vol. 5 , Issue 5 (Oct. 1997).

Bennett, J.C.R. et al. "High Speed, Scalable, and Accurage Implementation of Fair Queueing Algorithms in ATM Networks" IEEE Computer Society (Oct. 1997).

Bennett, J.C.R. et al. "WF$^2$Q: Worst-case Fair Weighted Fair Queueing" (IEEE Infocom Mar. 1996).

Chiussi, F.M. et al. "Implementing Fair Queueing in ATM Switches: The Discrete-Rate Approach." (IEEE Infocom 1998).

Chiussi, F.M. et al. "Minimum-Delay Self-Clocked Fair Queueing Algorithm for Packet-Switched Networks"(IEEE Infocom 1998).

Demers, A. et al. "Analysis and Simulation of a Fair Queueing Algorithm." © 1989 Association for Computing Machinery.

Eckhardt, D.A. et al. "Effort-limited Fair (ELF) Scheduling for Wireless Networks," IEEE Infocom 2000.

Golestani, S.J. "Network Delay Analysis of a Class of Fair Queueing Algorithms," IEEE Journal on Selected Areas in Communications, vol. 13 No. 6 (Aug. 1995) pp. 1057-1070.

Golestani, S.J. "A Self-Clocked Fair Queueing Scheme for Broadband Applications," IEEE © 1994 pp. 5c.1.1-5c1.11.

Greenberg, Albert G. et al. "How Fair is Fair Queuing?" Journal of the Association for Computing Machinery vol. 39 No. 3 (Jul. 1992) pp. 568-598.

Parekh, A.K.J. "A Generalized Processor Sharing Approach to Flow Control in Integrated Services Networks," Ph.D. Dissertation Massachusetts Institute of Technology (Feb. 1992).

Parekh, A.K. et al. "A Generalized Processor Sharing Approach to Flow Control in Integrated Services Networks: The Multiple Node Case," IEEE/ACM Transactions on Networking vol. 2 No. 2 (Apr. 1994) pp. 137-150.

Parekh, A.K. et al. "A Generalized Processor Sharing Approach to Flow Control in Integrated Services Networks: The Single-Node Case," (IEEE/ACM Transactions on Networking vol. 1, No. 3 (Jun. 1993) pp. 344-357).

"Quality of Service Networking," downloaded from the web (address: http://www.cisco.com/univercd/cc/td/doc/cisintwk/ito_doc/qos.htm, © Cisco Systems, Inc. © 1992-2006).

Rexford, J.L. et al. "Hardware-Efficient Fair Queueing Architectures for High-Speed Networks," IEEE © 1996 pp. 5d.2.1-5d.2.9.

Shreedhar M. et al. "Efficient Fair Queuing Using Deficit Round-Robin," IEEE/ACM Transactions on Networking vol. 4. No. 3 (Jun. 1996) pp. 375-385.

Stiliadis, D. et al. "Frame-based Fair Queueing: A New Traffic Scheduling Algorithm for Packet-Switched Networks," (Jul. 18, 1995) pp. 1-43.

Lau F. Et al., Distributed Denial of Service Attacks:, Systems, Man, and Cybernetics, 2000 IEEE International Conf. on Nashville, TN, USA, Oct. 8-11, 2000, vol. 3, pp. 2275-2280.

Geng X et al., "Defeating Distributed Denial of Service Attacks" IT Professional, IEEE Service Center, Los Alamitos, CA, USA, Jul. 1, 2000, pp. 36-41.

Spatscheck O et al., "Defending Against Denial of Service Attacks in Scout", Usenix Associatgion Proceedings of the 3rd Symposium on Operating Systems Design and Implementation, OSDI '99, New Orleans, LA, Feb. 22-25, 1999.

European Search Report dated Mar. 9, 2009, which issued during the prosecution of Applicant's European Patent Application No.: EP 01 98 1634.

* cited by examiner

METHODS AND APPARATUS FOR PROTECTING AGAINST OVERLOAD CONDITIONS ON NODES OF A DISTRIBUTED NETWORK

This application claims the benefit of U.S. Provisional Patent Application Ser. No. 60/240,899, filed Oct. 17, 2000, and entitled "Distributed Network Defense System," the teachings of which are incorporated herein by reference.

BACKGROUND OF THE INVENTION

The invention pertains to distributed data networks and, more particularly, protecting against overload conditions at nodes of such networks. It has application, by way of non-limiting example, in protecting servers, sites and other elements of networks, such as the Internet and the like, from distributed denial of service (DDoS) attacks and flash crowds.

Early computer systems were typically stand-alone devices that processed only commands and data entered via dedicated local keyboards, tape drives, disk drives, card readers, or the like. Remote access was possible, but only via phone lines and modems, which essentially served as surrogates or proxies to remote users' keyboards. By the early 1980's, a national network had been developed for carrying data communications between university, defense department and other large computer systems. This early Internet (known then as the ARPANET), which relied on a mix of dedicated lines and modems, was inaccessible to the public at large and, hence, subject to outages and espionage but, for the most part, not wide scale attack from "hackers."

Through the 1990's, that national network expanded around the globe adding millions of governmental, research and commercial nodes. The latter included so-called Internet service providers (ISPs) that afforded low-cost access to the masses. People being as they are, this included a mischievous if not downright scurrilous element intent—at least insofar as their time, resources and interests permitted—on blocking access to popular nodes (or "sites") on the network. The most insidious form of this cybervandalism is the distributed denial of service (DDoS) attack, in which the computers that service requests coming in to a node are swamped by millions of fake requests that may seem to come from many sources but, ultimately, emanate from a few hackers' computers.

Despite numerous DDoS attacks that have taken place over the past few years, with a surge of attacks on YAHOO, CNN, and many other major sites, there is still no known online solution for defense against them.

In view of the foregoing, an object of this invention is to provide improved distributed data networks and methods of operation thereof. A related object of the invention is to provide improved nodes, devices and methods of operation thereof for use on such distributed data networks.

Further related objects are to provide such improved data networks, nodes, devices and methods of operation thereof that provide enhanced protection from overload conditions, malicious, legitimate or otherwise.

A still further related object is to provide such improved data networks, nodes, devices and methods of operation thereof that provide enhanced protection from DDoS attacks.

Yet a still further object of the invention is to provide such improved data networks, nodes, devices and methods of operation thereof as can be used in existing networks, such as the Internet, as well as in other networks.

Yet a still further object of the invention is to provide data networks, nodes, devices and methods of operation thereof as can be implemented at low cost and are scalable.

SUMMARY OF THE INVENTION

These and other objects of the invention are attained by the invention, which provides, in one aspect, a method of protecting against an overload condition at a site, server or other network element (victim) in a set of potential victims disposed on a distributed network. The method includes using a first set of one or more network elements (which may, for example, already reside on the network) to selectively divert to a second set of one or more other network elements traffic otherwise destined for the victim. The element(s) of the second set filter the diverted traffic, selectively passing a portion of it to the victim. In diverting the traffic, the elements of the first set cause it to take a path that differs from the path it would otherwise take (in absence of such diversion). Thus, for example, rather than permitting the traffic to continue in its normal nodal path to the victim, a method according to this aspect of the invention effects redirection of the traffic to the element or elements of the second set, from which it may be rerouted back to the victim (e.g., after filtering and/or partial processing).

Still further aspects of the invention provide methods as described above in which elements of the first set are disposed at points around a region that may be referred to as a "protected area." Element(s) of the second set can be disposed external to the elements of the first set or may be adjacent with it, for example co-residing in the same network elements or nodes.

Further aspects of the invention provide methods as described above in which each potential victim is associated with at least two IP addresses, e.g., one by which the victim is publicly known (e.g., via the DNS system) and another by which the victim is privately known (e.g., only by elements of the second set or other select nodes within the protected area). According to these aspects of the invention, filtering can be effected by diverting all traffic destined to the first (public) address to elements of the second set and passing traffic to victim, only from those elements, using the second (private) address.

In related aspects, the invention provides methods as described above in which elements of the first set are selectively actuable to provide diversion, e.g., in response to DDoS attacks or other overload conditions. Diversion can be effected, by way of example, by declaring that the victim's public address is reachable through elements of the second set (or, put another way, that the public address is close in network distances to those elements). Alternatively or in addition, such diversion can be effected declaring that the public address is far away (in network distance) from the victim.

Yet still further aspects of the invention provide methods as described above in which diversion is effected by redirecting traffic as a function of an interface on which it was received, e.g., by routers or other elements of the first set (e.g., using Policy Based Routing of Cisco).

In further related aspects of the invention, diversion is effected using the WCCP (Web Cache Coordination Protocol) version 2 and, more particularly, for example, using Layer 2 destination address rewrite and/or GRE (Generic Routing Encapsulation), to route to elements of the second set traffic otherwise destined for the victim (as if the elements of the second set were web caching machines contemplated by WCCP). Packets that return from those elements can be routed onward to the victim using routing tables, e.g., in the elements of the first set that had diverted the traffic in the first instance or in (other) routers disposed between the elements of the second set and the victim.

Diversion can also be effected, according to still further aspects of the invention, through issuance of BGP announcements to cause traffic otherwise destined for the victim to be routed to the elements of the second set, and through use of Policy Based Routing (PBR) to effect routing of traffic from the second set of elements onward to the victim (e.g., via the corresponding elements of the first set).

In still further related aspects, diversion can be effected—e.g., at entrances to data centers or hosting centers—through use of BGP to cause traffic otherwise destined for the victim to be routed to elements of the second set, and through use of MAC or other layer 2 addresses to effect routing of traffic from the second set of elements onward to the victim.

Further aspects of the invention provide methods as described above in which the filtering of the diverted traffic by the second set of nodes includes detecting suspected malicious traffic. This can be, for example, traffic from selected origination points, e.g., those of a suspected hacker. It can also be traffic with spoofed origination or spoofed routing addresses.

Still further aspects of the invention provide methods as described above where filtering includes detecting traffic requiring a selected service from victim. Depending on the type of victim, this can be used by way of non-limiting example to pass to the victim only those packets which require the victim's specific services. Traffic requiring other services can be blocked, or handled by a network element of the second set.

By way of example, if the victim is an e-commerce site, packets involving customer orders can be passed to it by network elements of the second set. Other packets, such as UDP and ICMP can be discarded. If the service provided by the victim are different, such as a mail server or IRC, then the corresponding packets can be passed to the victim, while others that are not required by the victim can be discarded.

Other aspects of the invention provide methods as described above where the filtering includes at least partially processing the diverted traffic. This can include, for example, executing a verification protocol on behalf the victim (e.g., performing a three-way handshake with a source or querying it to require human input) in order to insure that any traffic passed to it is from legitimate sources and not, for example, potentially malicious. According to further aspects of the invention, partial processing can include storing and/or updating a "cookie" at a site that originated diverted traffic. It can also include modifying such a traffic to direct or redirect it to an alternate URL associated with the victim.

According to some aspects of the processing performed by the network elements of the second set is performed in the name of the victim, e.g., insofar as at least casual users at the sources are concerned. Other such processing is performed in place of processing by the victim, regardless of whether such users can discern the identity of the element that performed the processing.

In further related aspects of the invention, the elements of the second set can respond to traffic otherwise destined for the victim by (i) forwarding those packets onward toward the victim (unmodified, modified, pre-processed, verified, or otherwise), (ii) generating further packets for routing toward the victim or other elements and/or nodes on the network (e.g., for purposes of verification, further processing, or otherwise). In either case, routing of the forwarded or generated packets can be effected using the same techniques as those described above in connection with the forwarding of diverted packets from the elements of the second set to the victim. By way of example, packets generated by elements of the second set can be addressed by those elements to the victim or other nodes and can be forwarded thereto using routing tables, PBR, MAC or other Layer 2 addressing, among other mechanisms.

Still further aspects of the invention provide methods as described above in which one or more elements of the second set direct diverted traffic to still other network elements external to the victim, which other elements can perform full or partial processing on behalf of the victim (one possibility of which is acting as a distributed set of reverse proxies).

In still other aspects, the invention provides methods as described above in which the elements of the first set perform filtering, as well. This can include, by way of non-limiting example, comparing the source addresses of traffic against the interfaces on which that traffic is received. It can further include sampling traffic that arrives on network interfaces, tracking changes in its paths and/or interrogating sources of that traffic to validate legitimacy.

Yet still further aspects of the invention provide methods as described above in which the filtering step includes detecting differences in traffic patterns on the network. This can include recording network flow, server logs or the like to discern traffic volume, port number distribution, periodicity of requests, packet properties, IP geography, distribution of packet arrival/size, and/or other aspects of potential victim traffic when the victim or set of potential victims is/are not overloaded. Moreover, it can include monitoring these (or other) aspects of victim traffic at the onset or during an overload condition, such as a DDoS attack. Victim and potential victim traffic can be classified, according to related aspects of the invention, by their source types, e.g., whether they arise from individual users, plural users sharing host or proxy, web crawlers, monitoring servers, and so forth.

The filtering step, according to these and other aspects, includes comparing traffic patterns when system is under an overload condition with expected such, e.g., patterns from a prior period. Such comparison can include identifying changes that differ in a statistically significant way from expectation or historical patterns.

Further aspects of the invention provide methods as described above in which one or more elements generate rules for filtering further network traffic. These rules, which can be carried out by the elements of the first or second sets, can specify netflows to filter and duration for filtering.

Methods according to the aforementioned aspects of the invention can include detecting the attack, or putative attack, with the elements of the first set, the second set, or the victim, itself. Moreover, utilizing the techniques described above, diverting and/or filtering can be effected selectively, e.g., on request of the victim (or another node) that detects the attack.

Still further aspects of the invention provide nodes and devices, such as routers, switches, servers and other devices, operating in accord with the methods described above. For example, an element of the second set can include an input that receives traffic from network and an output that passes filtered traffic to a victim, e.g., via the network. A filter module blocks traffic from sources suspected as potentially causing the overload condition and is coupled to a statistical element that identifies such sources using statistics.

Such an apparatus can additionally include a module for detecting termination of the overload condition. Moreover, according to further aspects of the invention, it can include functionality that transmits to further elements on the network, e.g., those of the first set that operate an ingress filter, rules for blocking traffic. An antispoofing element, moreover, can prevent sources of malicious traffic from generating packets with spoofed source IP addresses.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Network Architecture

Figure 1:
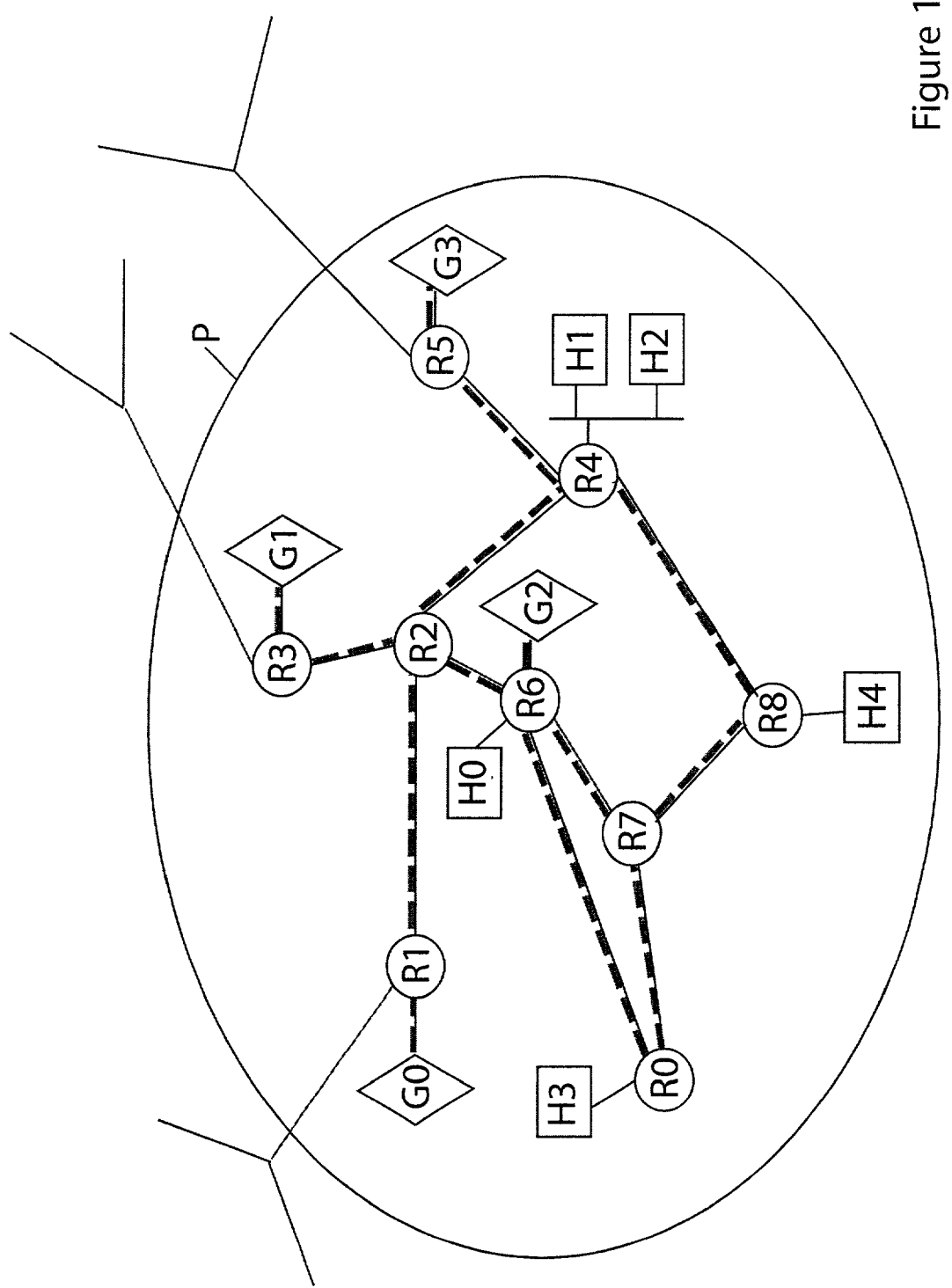
FIG. 1 depicts a distributed network configured and operating according to the invention.

FIG. 1 depicts a protected area P within a distributed network in accord with the invention. Illustrated are a first set of network elements R0-R8, a second set of network elements G0-G3, and a plurality of potential victims H0-H4, all interconnected by network connections. The solid lines represent communication links within the protected area P as well as between elements in that area and a non-protected area outside the oval.

The first set of network elements R0-R8 of the illustrated embodiment comprise routers of the type commercially available the marketplace and commonly used on an IP network, such as the Internet. Other network elements (by way of non-limiting example, switches, bridges, servers, "guard machines" as described below, or other digital data apparatus) capable of redirecting traffic and otherwise providing the functions attributed below to the routers may be used instead or in addition. Though nine elements of the first set are shown, those skilled in the art will appreciate that greater or fewer such devices can be utilized in a network configured according to the invention.

Figure 2:
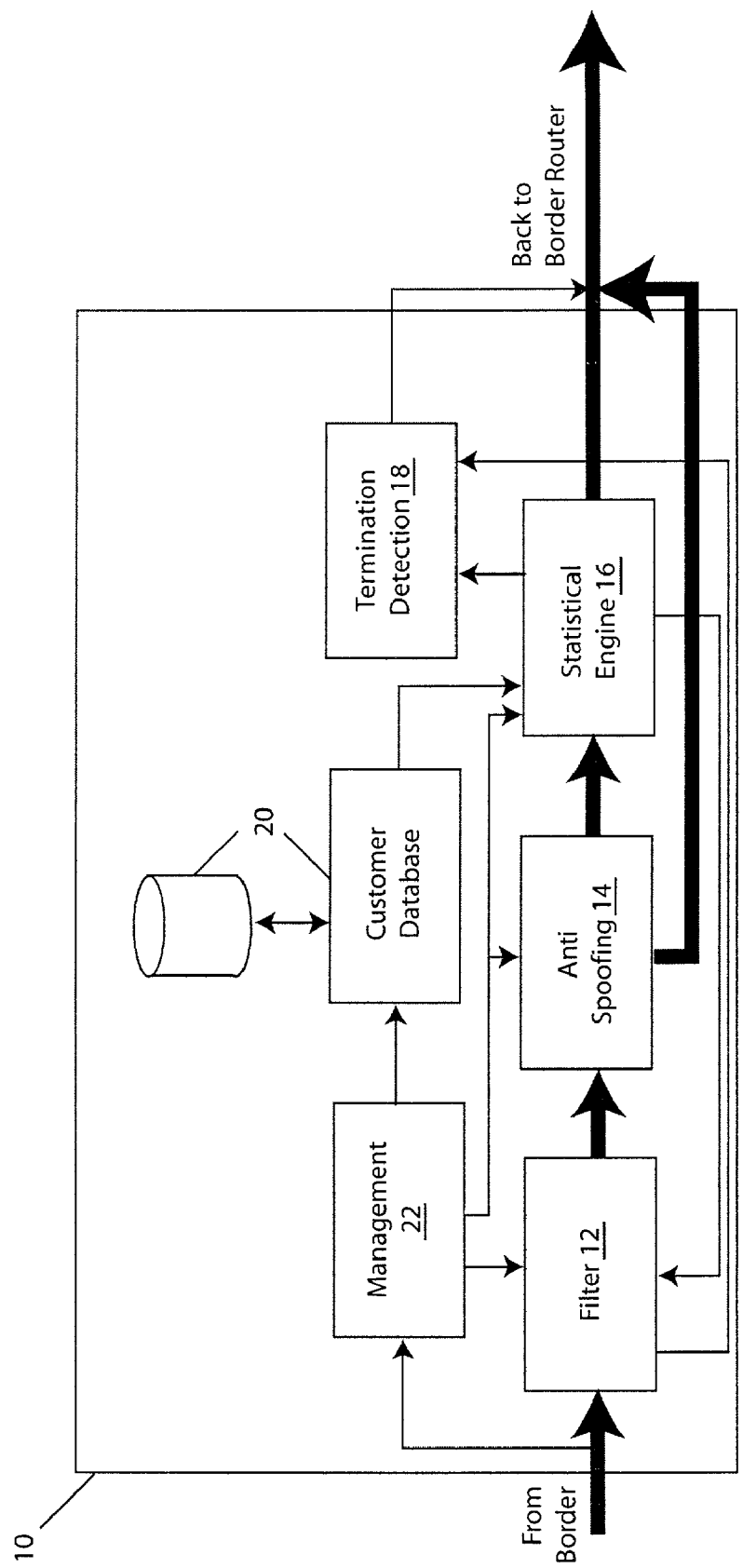
FIGS. 2 and 3 depict the architecture of guard machines according to the invention.

The second set of network elements G0-G3 of the illustrated embodiment comprise "guard" machines of the type illustrated in FIG. 2. Other network elements (by way of nonlimiting example, routers, switches, bridges, servers or other digital data apparatus) capable of filtering traffic and otherwise providing the functions attributed below to the guard machines may be used instead or in addition. Though five network elements of the second set are shown, those skilled in the art will appreciate that greater or fewer such devices can be utilized in a network configured according to the invention.

As shown in the illustration, there need not be a one-to-one correspondence between elements of the first and second sets. Moreover, elements of the second set may be disposed adjacent to elements of the first set, e.g., in close proximity in physical and/or network distance or even as part of a common piece of equipment. An example is provided by elements G3 and R5. Likewise, elements of these various sets may be disposed external to one another, e.g., separated by physical or network distance. Such is the case, for example, with elements R4 and G2 or G3.

The potential victims H0-H4 of the illustrated embodiment comprise web sites, hosts and servers of the type commonly used on an IP network, such as the Internet. In addition to sites, hosts, and servers, the illustrated embodiment can be used to protect any device with an IP address or interface card to the Internet, such as, any computer connected to the Internet routers and other devices.

The protected area forms a region on the Internet. The invention can be used with any variety of distributed (or data communication) sub-networks including dedicated networks, local area networks (LANs), wide area networks (WANs), data-centers, metropolitan area networks (MANs), to name a few, whether or not IP based.

Diversion

Illustrated R0-R8 or other network elements providing such functionality (collectively referred to below as "routers" or "peering routers") are placed at points around a protected area of the network. This may be, by way of non-limiting example, a so-called autonomous system (or even a portion thereof), it may also be any other area (e.g., subnetwork) in or on a network, e.g., access points on the Internet surrounding an internet service provider (ISP) and/or its clients. In a case where the protected area is an autonomous system, these points can include the so-called peering points, i.e., points defining all ingress (and egress) routes to that area. In any event, the protected area includes protected elements H0-H4, collectively referred to below as "hosts," "victims" and/or "potential victims."

Under normal circumstances, routers R0-R8 pass traffic to and from potential victims H0-H4 (as well as to and from other network elements) in the conventional manner. When a potential victim, e.g., host H0, comes under an anomalous traffic condition, however (e.g., as caused by a DDoS attack or flash crowd) the routers R0-R8 selectively divert traffic destined for that victim H0 to one or more guards G0-G3, as described below. Following filtering and/or at least partial processing of the diverted traffic, some or all of it (e.g., non-malicious packets, in the case of overload conditions resulting from DDoS attacks) may be directed from the guards to the victim H0.

In addition to diversion, the routers R0-R8 can provide ingress filtering, e.g., when the host H0 is under overload, utilizing rules defined by the guards G0-G3, also as described below.

In view of foregoing and the discussion that follows, it will be appreciated that the routers R0-R8 selectively divert traffic, e.g., when a host is under an overload condition, causing that traffic to take a path that it would not normally take, e.g., when the host is not under such condition. That diverted path may be to an adjacent guard machine (or to guard machine processing circuitry and/or circuit pathways, in the case of a router and guard that are co-locate) or to a remotely disposed such machine.

Activating Protection

Upon suspecting that an overload traffic condition such as a DDoS attack is being mounted on it or that an overload condition is otherwise occurring (collectively, attacks and overload conditions are sometimes referred to below as an "attack"), a victim or another device alerts the guards G0-G3 through a communication channel supplied by the backbone provider. For example by sending authenticated messages to the NOC (Network Operations Center) from where the signal is relayed to the diverting routers and/or the guards over a secure channel such as SSH (SNMP or out of band communication, or simply IVR systems may be used instead). The alert message contains the identity of the victim machines, (which includes their IP addresses). At this point the victim enters the "protected" mode.

In this "protected" mode all or most of the traffic flows to the victim have to be diverted such that: (1) all the traffic whose destination is the victim, from either outside the protected area that hosts the victim or from inside the protected area, is redirected to the guards; and (2) all or most of the traffic that reaches the victim must have passed through one of the guards, i.e., no or nearly none of the traffic can reach the victim without passing through the guards.

The "Double Address" Diversion Method

In the illustrated embodiment, two IP addresses are associated with each potential victim destination machine (server) the server public address and the server private address. The server public address is the IP address of the server which is published all over the Internet through the DNS system. The server private address is an IP address used solely to transfer packets between the guards and the victim, while the guards protect the victim. Therefore, the server private address is recognized only by either router interfaces that are connected to internal links of the hosting protected area backbone, or to the guards, or to the server interface (The set of links with associated interfaces over which the private IP address is recognized is depicted by dashed lines in FIG. 1). All other interfaces, such as, peering-connections that come from outside the protected area, or links that are connected to other customers of the protected area (stub networks), discard any packet whose destination is the server private IP address (for example, this is easily and efficiently achieved by using the CEF mechanism of Cisco routers). (See FIG. 1). This ensures that no hacked daemon can generate traffic to the victim private IP address.

To achieve the above setting all the interfaces that are connected to peering links, i.e., links that connect to either other networks or to external hosts and customer networks, are permanently programmed to discard traffic destined to the server private IP address. In normal operation when no attack is being mounted, the victim declares itself to be at distance zero from both the server private IP address and the server public IP address. This causes the routing protocol to set entries in the forwarding tables in all the protected area routers, to forward messages destined to either address to the victim (which is now not a victim) machines.

To divert traffic destined to the public IP address, server traffic that arrives from outside the hosting protected area during an attack must pass through one of the border routers, i.e., a peering or NAP, BGP routers. A guard machine is placed in each entry next to the boarder routers at this point. Upon receiving the alert of a possible attack on a victim all these border routers are set to forward all the traffic arriving from outside of the network (protected area) and whose destination IP address is the victim public IP address, to the guard machine which is placed next to them. This can be achieved for example by injecting the appropriate update to the boarder routers, updating their policy routing mechanism. Updating the policy routing mechanism, gives us the ability to change the routing behavior without degrading the border routing performance. All the traffic returning from the victim to trusted clients is passed through the corresponding guard machine. Other methods of diverting the traffic destined to the victim are provided, such as, using the appropriated BGP announcement (with a no advertise setting).

To divert traffic destined to the victim public IP address that originates from within the hosting protected area to the internal or boarder guards, a similar mechanism can be used. That is, to inject when the alert is received, the desired routing information into all the routers. However, this requires updating the policy routing of all the routers in the protected area. In many cases (large networks), it is more beneficial to use a different method, based on a simple routing manipulation. In this method, when the victim suspects that an attack is being applied, it declares itself to be at a large distance from the server (victim) public IP address. At the same time the guards would start to declare that they are at distance zero (or close to zero) from the server (victim) public IP address. This routing updates quickly spread in the protected area network, using the standard routing protocol, e.g., OSPF, EIGRP or RIP (unlike BGP, these routing protocols adapt very quickly to topological changes). Thus, within seconds from these declarations all the traffic whose destination is the victim public IP address, is automatically diverted to the guards. Again, other alternatives to achieve this diversion are possible, such as, using GRE (Generic Routing Encapsulation) tunnels from the internal routers to the guard machines.

It will be appreciated that the same method can be used to divert the traffic to the guards at the peering points. That is, one may choose between the two diversion methods.

In some case in order to handle the volume of the intra network traffic, it may be beneficial to use not one guard machine, but a farm of guard machines. However, the problem of attacks, and specially spoofing attacks, in most of the cases is harder when the attack is originated from outside the protected area. When the attack is originated from inside the network, there is full information and management of the network. Hence ingress and egress filtering can be used, to deal with spoofing attack. In cases when the origins of the attack are known, one can more easily stop the attack, by disabling/blocking the origins of the attack.

When the guards decide that the attack has terminated, they pass an appropriate message to the victim machine. At the same time they reverse the above settings, that is, they stop declaring that their distance from the server (victim) public IP address is zero, while the victim starts declaring again that it is at distance zero from its public IP address.

Notice that in the "protect" mode several guards may all claim to be at distance zero from the victim public IP address. This divides the protected area into clusters, such that packets with this destination address in each cluster are routed to the guard residing within that cluster. However, there might be routers on the boarder between two or more such clusters with equal distance to two or more guards. This may introduce routing instability, where some packets of a flow go to one guard and some packets go to the other guard. First notice that this effects only victim traffic that originates inside the protected area. The victim traffic that arrives from outside the protected area is treated by the guard at the entry point which acts as a proxy for that traffic. Thus outside traffic would suffer from route flapping only if these flapping are introduced by BGP, which is very rare. To avoid the flapping of victim traffic originating inside the protected area, each guard declares that it is at a very small but different distance from the victim public IP address. These small perturbations ensure that no router would be at equal distance from two guards. The exact calculation of this perturbation is automatically calculated given the map of the ISP's backbone that is covered by the protected area.

In the network of FIG. 1, the victim private address is known only to trustable parts in the networks, i.e., the interfaces of routers that connected to another router or to the guard machines. The routes in the network where the victim private address is known is marked by dashed lines.

In some situations it may be also be a burden to manage and configure each potential victim with two IP addresses (the public one and the private one). Here, it can be desirable to use an existing NAT before the server (if such exists) to translate the private IP address to the public address.

A possible choice for the private IP address, is to use an address from the private IP addresses space as defined in RFC 1918. Moreover, to avoid misuse of these address, most of the networks, use ingress and egress filters, to stop packets destined to a private IP address at the border of the network autonomous system.

Alternative Redirection Mechanisms

An alternative redirection scheme that avoids the duplication of the potential victims (targets) IP addresses can use the routers capabilities to route based on the incoming interface card (what is knows as Policy Based Routing (PBR) in Cisco which is also supported in a similar way by Juniper). That is, the router can decide on which interface card to send packet with destination X out, depending on which interface card the packet has arrived. In this alternative method, during an attack (or other overload condition), the peering routers are instructed (via appropriate changes to the forwarding tables) to forward victim's traffic that arrives from either a peering connection or an access connection, to the guard machine (i.e., to the interface that connects to the guard machine). On the other hand, traffic to the victim that arrives from the guard interface card would be forwarded as usual towards the victim. Thus, this scheme requires per interface forwarding and a connection to a guard machine at each peering or access router. All backbone connected interfaces (i.e., internal connections from the ISP point of view) can forward the traffic towards the victim, as in normal operation.

In an alternative redirection mechanism, the PBR method is used only on the interface card connected to the guard. To get the victim's traffic to the guard an appropriate BGP announcement is given to the router by the guard. In this alternative the route table is updated via a BGP announcement (with a no advertise indication) to direct victim's traffic to the guard, and the interface card connected to the guard is programmed with PBR to forward the victim traffic to the appropriated next hop. The appropriated next hop is determined based on the routing information available at the router both prior to the redirection and following the redirection.

In a further alternate embodiment, diversion is activated and achieved, in response to anomalous traffic, DDoS attacks or other overload conditions, by using the WCCP (WEB Cache Coordination Protocol) version 2. This protocol, originally designed to support transparent WEB caching is designed to do data diversion of specific flows that arrive on particular interfaces (interfaces coming from the clients). Within WCCP two diversion methods are provided, Layer 2 destination address rewrite for WEB caches directly connected to the router and GRE (Generic Routing Encapsulation) for remote caches. Packets that return from the cache to the router are then routed according to the router's routing table. WCCP allows the nodes of the second set to activate diversion by talking with the nodes of the first set using the WCCP protocol. WCCP can be used for diverting victim's traffic to the guard (as if it was a web caching machine). The traffic that the guard would return to the router (node of the first set) is routed by the router as it would normally be routed (without any diversion).

In an alternate embodiment, diversion is activated and achieved, in response to anomalous traffic, DDoS attacks or other overload conditions, by using BGP announcements to get the traffic whose destination is victim to the nodes of the second set and using Policy Based Routing (PBR) for the traffic that the second set returns to the corresponding first set node. In this case.

In related aspects, the invention provides methods as described above in which elements of the first set are selectively activated to provide diversion, e.g., in response to DDoS attacks or other overload conditions. Diversion can be effected, at certain configurations, mostly in the entrances to Data Centers or hosting centers by again using BGP to get the victim's traffic from the first set to the corresponding node of the second set, and then the corresponding node of the second set writes the MAC address or any other layer 2 address of the desired next hop on the diverted packets it sends out.

In still further embodiments of the invention, diversion can be effected by a combination of foregoing diversion mechanisms, for example, a combination of the BGP method (to get the traffic over to the guard) and some of the other methods, such as, PBR and/or GRE (Generic Routing Encapsulation) to route the packets coming back from the guard to the router.

One potential drawback here is how to redirect traffic originated in the protected area to the guard machines inside the protected area. A solution employed in one embodiment of the invention is to put guard machines also in every access router. Even where this (or another) solution is not employed, in the worst cases, the alternative redirection mechanism described here affords protection at least from attacks (or other overload-effecting sources) arising outside the protected area. However, this is indeed where the most of the jeopardy comes from—from outside the protected area and not from inside the protected area. This is due to the fact that inside the protected area, the network owner is in control: He can use ingress and egress filtering, backtracking to find the attacker (or other overload sources).

Recap and Overview of Network Operation and Features

Networks configured and operated in accord with the illustrate embodiment provide for continuous operation of victim servers during a DDoS attack or other anomalous or overload condition. Internet Service Providers (ISPs) and other suppliers (e.g., data centers and hosting providers) operating guard machines G0-G3 and routers R0-R8, or like functionality, can provide protection to all computers, routers, servers and other elements residing in the protected area of the network, thus, relieving those elements from the need to provide their own protection from DDoS attacks or other overload conditions.

The guard machines and routers of the illustrated embodiment provide distributed computational power that is invoked when an attack is being mounted. This distributed computational force helps the victim(s) at attack time, by sieving the malicious or overload traffic. Moreover, by stopping that traffic at the border, other network elements within the protected area are protected from side effects that could have been caused by the excess traffic of the attack at the routers.

The illustrated embodiment features economy of scale. A set of guards machines placed around a portion of the network, such as a protected area P, provides protection from DDoS and other overload conditions for any site or network element inside that area that wishes to be protected. Placing the solution at the ISP level, for example, provides any site small or big a protection from an attack at the full volume that may be supported by the network and the protection system. In this regard, it will be appreciated that attack volume (bits per second) is not a function of the target size, small sites may be attacked at the worst case attacks. Thus any node, big or small, needs the maximum protection of the type provided by the illustrated system. The alternative would be for each site or server to acquire the maximum protection on its own, which is far from being economical.

The protection offered by the illustrated embodiment is fault tolerant. The guards are placed in such a way that no failure in a guard can disrupt the normal operation of the network. That is, the guards may at worst do nothing but, in any event, they do not degrade the network performances more than it would otherwise be in either normal operation or during an attack.

The protection offered by the illustrated configuration is also flexible. It can be provisioned to servers and elements requiring protection. That is, the list of sites and elements being protected can be any subset of these that reside inside the protected area.

By way of review and overview, operations in the illustrated embodiment include the following steps: detection, alert, divert, sieve, and termination detection. Those skilled in the art will, of course, appreciate that other embodiments may use greater or fewer steps and, moreover, that those steps may vary from the specifics described below.

Detection.

The illustrated embodiment assumes that an attacked victim has an automatic mechanism that detects and alerts when an attack begins. Such mechanisms are provided by different routers, firewall equipment, intrusion detection systems, and operating systems. Some data-centers and hosting farms provide servers health check mechanisms that monitor their clients condition, one of which is overload and anomalous traffic condition. For sites without such a detection mechanism, any number of conventional techniques can be employed within the victim, within the guards, or at any other suitable node in the network (collectively, the "alert nodes" or "alert network").

Alert.

Upon suspecting that an attack is being mounted on it, a site (or other alert node) raises the flag and generates an alert that activates a network of guard machines that are located at strategic points around an area of the network in which the victim resides. The alert signal, from the alert node, would usually go through the NOC (Network Operations Center) and from the NOC to the guard machines. For example, in one embodiment, guards are placed around the protected area that hosts the victim, one guard at each peering point.

Divert.

In addition, the alert network invokes a rerouting mechanism (e.g., the routers R0-R8, or similar functionality) that ensures that all traffic originating outside the protected area (and at least some, if not all, traffic from within that area) destined to the victim is diverted to, and passes through, the guards. Thus, in the case of a DDoS attack, for example, there is no way for a malicious daemon to send a packet directly to the victim on a route that passes any of the selected nodes.

Sieve.

When an alert arrives at a guard and the victim traffic is being received, the guard sieves the traffic to sort out the "bad" (or excess) packets and pass on to the victim only the "good" (or non-excess) traffic. Under certain conditions the guard may process the requests that are being sent to the victim, on the victim behalf, either at the guard machine or by forwarding the requests yet to another node (by way of a non limiting example, a reverse cache proxy) that would process the requests on the victim behalf.

Termination Detection.

While the guards actively protect a victim they monitor the amount of "bad" packets they sieve out. If the total amount sieved out by each of the guards subsides below a certain level for a long enough period of time the attack is defined to have terminated and the diversion is stopped, routing of victim traffic returns to normal operation and the sieving of victim traffic is thus also stops. In general the guards continuously send indications on the level of attack to the NOC, and the decision to stop the protection and inactivate the system with respect to a victim may be taken at the NOC.

The Guard Machines

FIG. 2 depicts the architecture and operation of an embodiment of a guard machine 10 according to the invention. The device 10 includes a filter 12, anti-spoofing module 14, statistical engine 16, termination detector 18, customer database 20, and management module 22, interconnected as shown in the illustration and evident in the discussion below. These functions can be implemented in software, firmware or hardware within a stand-alone networked digital data processing device, or as part of (or otherwise in connection with) a switch, router, personal computer, workstation, server, or other digital data processing apparatus.

Filter function 12 receives the diverted data and classifies it according to different rules (filters) given to it. With each filter-rule given to the filter an action may by associated. The filter-rules are placed in the filter either when the guard starts protecting a victim or dynamically by the management of the guard in response to indications received from the statistical engine. Actions associated with filter-rules tell the filter what to do with the flows/packets that match that filter. Some of the filter-rules block packets originating from IP addresses or subnetworks that were suspected as being a source of malicious traffic, e.g., as determined by statistical engine 16. Other actions could tell the filter towards which other module to direct the traffic that corresponds to the respective filter-rule.

Anti-spoofing function 14 authenticates and verifies for each flow (<source-address, destination-address, source-port, destination-port>quadruple that a real process at the client with that source-address and behind that source port-number has initiated this TCP flow. This is done in the known way of completing the TCP three-way handshake process at the guard on behalf of the victim. From this point on, for the duration of this connection (determined by the quadruple), the guard becomes kind of low-level proxy between the client and the victim server. One aspect of the syn-defender (another name for the TCP anti-spoofing block) is that once the traffic is cleaned from spoofed packets it can be statistically analyzed to detect for example sources of malicious TCP traffic (which would have been much harder without first cleaning out the spoofed packets).

Statistical engine 16 detects and singles out flows or aggregates of flows (aggregates are identified by any subset of the quadruple and the IP addresses in the subsets may be replaced by subnetworks) with irregular/suspicious behavior. Once a miss behaving flow is detected the necessary modules are activated to sieve out this flow. This process of treating the miss behaving flow could include further more refined study of the sub-flows of this flow, or activating a special set of one or more modules that clean such a flow, or the identity of these flows is passed to filter 12 for blockage.

Termination detection function 18. All the guards cooperatively decide when an attack has stopped and the victim may return to peaceful operation mode. This termination detection has two steps: First each guard individually monitors the volume of "bad" (or overflow) traffic it blocks for a particular victim. Secondly, when this volume subsides at all the guards for a long enough period of time then a collective decision that the attack has terminated is reached. The collective decision is reached in one of two ways: either by each guard reporting its level to a central point such as the NOC and the NOC decides termination as a function of all the indications it gets from all the guards, or in a more distributed way in which each guard receives these indications from all the other guards and decides according to these indications.

Customer database 20 (including illustrated storage module and interface module) maintains statistical information about each potential victim traffic patterns and about default settings for the filter/classifier, WFQ (discussed below) and throttling level (discussed below). The default settings for the filter/classifier indicate what types of packets/traffic the filter may deny access to the victim while the victim is under stress.

Typically these would be flows and packets that are not that important for the victim and it could continue providing its basic and important intended service without getting these type of traffic.

Management module 22 fulfills two basic functions. First it coordinates interaction between the other elements of the guard machine, e.g., getting indications from the statistical engine and passing resulting decisions to the filter, or facilitating flow of packets there through. Second, it interacts with the management application that could reside elsewhere (e.g., at the NOC), receiving from it instructions and passing the resulting commands to the appropriate modules in the guard, e.g., to start or stop protecting a particular victim, to start or stop blocking particular types of traffic for a particular victim, etc.

With respect to overall flow in the device 10, thick lines in the drawing represent the flows of victim traffic through the machine while the thinner lines represent control and other information paths. Preferably, packets first pass through the filter, then through the anti-spoofing and finally through the statistical module, as indicated in the drawing.

Figure 3:
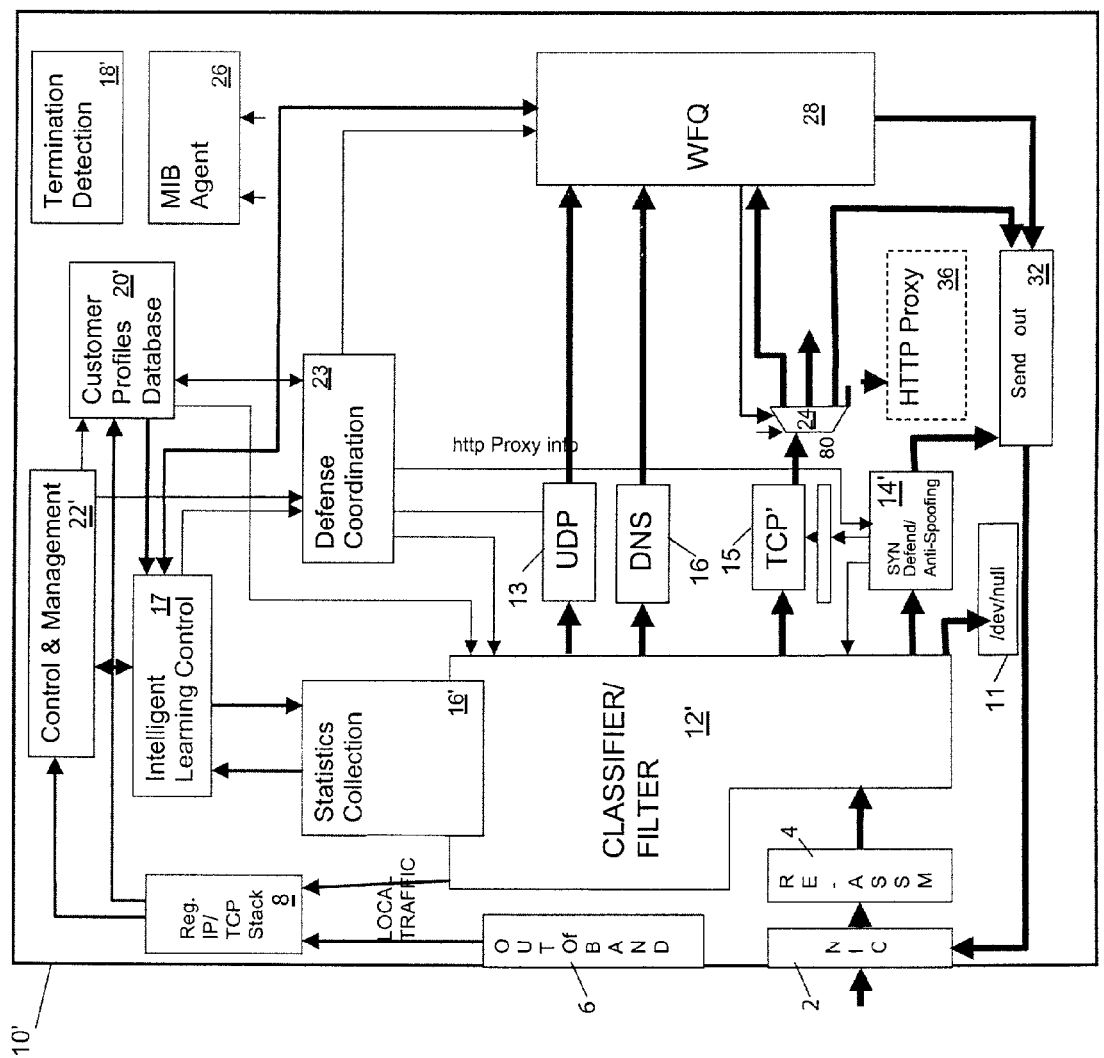

FIG. 3 depicts the architecture and operation of alternate embodiment of a guard machine 10' according to the invention. The machine 10' includes a management element 22' and defense coordination element 23 which, together, correspond to element 22 of FIG. 2; termination detection element 18' which corresponds to element 18 of FIG. 2; statistical collection element 16' and intelligent learning control element 17 which, together, correspond to element 16 of FIG. 2; classifier/filter element 12' which corresponds to element 12 of FIG. 2; Syn-defender/anti-spoofing element 14' and TCP element which, together, correspond to element 14 of FIG. 2; customer profiles database element 20' which corresponds to element 20 of FIG. 2; termination detection element 18' which corresponds to termination detection function 18 of FIG. 2; NIC element 2; re-assembly element 4; out of band element 6; regular TCP/IP stack element 8; /dev/null element 11; DNS element 16; defense coordination element 23; TCP traffic de-multiplex element 24; WFQ element 28; send out element 32; HTTP proxy element 36; MIB agent element 26. The elements are interconnected as shown, though, for clarity, not all the interconnections are presented.

With reference to FIGS. 2 and 3, each guard machine 10, 10' receives a portion or all of the traffic destined to a victim or a set of victims and sieves out the malicious (or excessive) traffic, forwarding to the corresponding victim legitimate traffic at a rate it (the victim) can sustain. In doing so, the guard is like a large filter identifies "bad" packets (or packets that would otherwise cause an overload condition) and discards them. The guard machine 10, 10' architecture described here includes elements that, individually and/or together, block and detect most malicious (or excessive) traffic flows. In the case of DDoS attack, even if the "black hats" (hackers) generate a large amount of traffic that looks legitimate, the guard machines (e.g., working in connection with the routers R0-R8) protect the victim from overload in the form of an API to a large distributed reverse proxy (element 36). The size of the reverse proxy connected with the guard system corresponds to the power the illustrated system.

Among other things, the guard machines 10, 10' perform the following functions:

1) Clean noise generated by malicious (or overload event-causing) sources at the lower layers of communication before cleaning the higher layers of traffic. By way of analogy this is similar to cleaning a noisy signal in signal processing, where low phase filters block higher frequencies first, before lower frequency signals may be analyzed and cleaned. In the case of the DDoS, the guards 10, 10' preferably filter spoofed packets first. The traffic passed to the statistical analysis and WFQ modules is assumed to be non-spoofed; otherwise the effectiveness of these modules may be reduced. Moreover, once the traffic is non-spoofed at the packet layer, new modules are introduced that clean the traffic from higher level spoofing, e.g., from masquerading legitimate users that generate large volumes of traffic.

2) Invocation on demand of different modules as dictated by the statistical attack identification module. The statistical engine function 16 (FIG. 2) or 16' and 17 (FIG. 3) detects the presence of different generic attack methods in the steam of victim traffic. As soon as an attack type is detected, the corresponding defending element (e.g., guard(s) and/or router(s)) are invoked and activated on the corresponding traffic. For example, if the attack identification identifies an exceptional volume of DNS requests, the engine 16 or 16'/17 concludes that a DNS request attack is being mounted and the DNS defense module 36 is activated. The classifier 12' redirects the victim DNS traffic to pass through the DNS defense module 36'.

3) Zooming principle in the statistical attack identification module. The statistical engine 16 and 16'/17 first monitors the traffic at a certain level of coarseness. Once an exceptional volume is detected at certain type of traffic (e.g., UDP), a more refined statistical detection is invoked to find out more specific parameters of the offending traffic flow. Continuing the UDP example, the more refined detection would find what port number and/or what source IP address is generating the attack, if the attack is not spoofed over many addresses and/or port numbers.

Victim traffic that has neither been identified as malicious nor has been processed on behalf of the victim (e.g., by the guard or other node) is passed on to the victim. Still, to ensure that no denial-of-service attack goes unnoticed, the guard 10' throttles the amount of traffic passed on to the victim. That is, only a certain amount of traffic is allowed to be passed on from each guard to the victim. Thus, regardless of whether an DDoS attack is being mounted, an activated guard prevents an traffic overload condition at the victim node.

The amount allowed from each guard is initially set by a victim default profile (stored in the customer profiles database element 20, 20'), though this may be dynamically modified in coordination with the amounts other guards are passing to the victim. Whenever the amount of traffic that is being passed to the victim is larger than the rate allowed, the excess is queued up in a Weighted Fair Queuing (WFQ) module 28. This module controls access rate to the victim, using fair access rate to all the clients. The idea is to use a weight to each queue that could for example correspond to clients or source IP addresses, or any other traffic classification parameters, such as port numbers, and/or protocol types.

Each queue weight is proportional to the estimate of traffic from each such source (client). A malicious client that attacks (or a legitimate client that is making too many requests) and, hence, is applying a larger than expected volume on the victim, is throttled by the WFQ, and thus limiting the effect it applies on the access rate of other legitimate clients. Default settings for the WFQ indicate which sources (IP addresses) should get a larger relative share of the victim bandwidth, and default settings of the throttling levels are a function of the victim available bandwidth and the relative amount of it that should pass through this guard.

Traffic flow through guard 10' can be like that of guard 10. Alternatively, in guard 10', packets can first pass through the filter/classifier 12', then through one of the modules, DNS 36, UDP 13, TCP 15/anti-spoofing 14', then through a weighted-fair-queuing module 28. In addition, the statistical module 16'/17 monitors the activities in each of the modules to detect misbehaving traffic flows and/or suspicious traffic patterns that could indicate an attack type or point out a malicious source.

Referring to FIGS. 2 and 3, it will be appreciated that the statistical engine 16 (FIG. 2) and the statistical collection 16' together with the intelligent learning control 17 (FIG. 3) monitor the victim's TCP traffic (among other traffic types) after it has passed the anti-spoofing module 14'. This gives the statistical engine 16 or elements 16' and 17 the ability to effectively detect sources that generate exceptional volumes of traffic without confusion from spoofed traffic. Similar logic also works for UDP and other types of IP traffic. Moreover, the different lines of defense (each being a module inside the guard box) are activated by the statistical engine 16 or 16'/17 only if an exceptional behavior is noticed in a particular type of traffic (TCP, UDP, DNS, ICMP, etc).

NIC element 2 is the network interface card through which the guard machine is connected to routers or other members of the first set of nodes. The NIC could be a 1 Gbit/sec or an OC3 or and OC12 or any other NIC.

Out of band element 6 is an interface to a separate channel of communication through which network managers/operators and other authorized elements privately and securely communicate with the guard machine. This separate channel of communication is a dedicated communication medium not open to the public. The corresponding interface can be a serial interface or any NIC or other medium interface used by the managers and/or operators of the protected network.

Regular TCP/IP stack element 8 receives the out-of-band communication, which arrives from the network operators and passes it to the appropriate elements in the guard machine, such as, to the control and management element 22' and/or customer profiles database element 20'.

Re-assembly element 4 receives the diverted traffic and checks for fragments in the TCP part of the traffic. It collects the fragments and re-assembles complete packets, which are fed through the other elements of the guard machine. In doing so this elements communicate with the statistical collection and intelligent learning control elements to detect attacks that are based on sending large volumes of fragments. In such a case the Syn-defender/anti-spoofing element 14' provides feedback regarding the nature of spoofed fragments (for which no connection was opened by the syn-defender element 14'). In addition a small per source queuing system within element 4 helps in mitigating fragments attacks.

Classifier/filter element 12' behaves much like the filter function 12 in FIG. 2. It receives the diverted data and classifies it according to stored rules (filters). With each filter-rule, there may be an associated action. The filter-rules are placed in the classifier/filter either when the guard starts protecting a victim or dynamically by the management of the guard in response to indications received from the statistical collection and the intelligent learning control elements 16' and 17. Actions associated with filter-rules tell the filter what to do with the flows/packets that match that filter. Some of the filter-rules block packets originating from IP addresses or subnetworks that were suspected as being a source of malicious traffic, e.g., as determined by the intelligent learning control element 17. Other actions can direct the classifier/filter towards which other elements to direct the traffic that corresponds to the respective filter-rule. Thus, by way of a non-limiting example, if the intelligent learning control element decides based on the statistics data it receives that a DNS attack is being mounted, it registers a new filter-rule saying that each packet belonging to the DNS protocol is now forwarded to the DNS element 16.

Statistical collection element 16' collects samples and builds statistics about types of flows that pass through the different elements of the guard machine. The function of element 14 in FIG. 2 is broken down into two elements in FIG. 3, the statistical collection element and the intelligent learning control element. The statistical collection element can collect statistics about a new type of flow as decided by the intelligent learning control element. This happens in the case that a more refined analysis is necessary of a high volume flow in order to figure out which source, or other sub type generates the exceptional volume in that type of flow. The statistical collection element first monitors the traffic at a degree of coarseness. Once an exceptional volume is detected by the intelligent learning control element for a given type of traffic (e.g., UDP), a more refined statistical detection is invoked to find out more specific parameters of the offending traffic flow. This is achieved through monitoring by the statistical collection element 16' (at the command of element 17) of a more refined sub-flow traffic volume. Continuing the UDP example, this more refined detection would identify what port number and/or what source IP address are generating the attack (which is a UDP attack), if the attack is not spoofed over many addresses and/or port numbers.

Intelligent learning control element 17 obtains the statistical information from element 16' and makes decisions using learning methods (e.g., simple threshold passing, or decision trees, or other learning decision methods). The elements becomes more powerful with type of interaction it has with the statistical collection element 16' and the defense coordination element 23. Through interactions with the statistical collection element 16', learning control 17 can provide more refined statistics that would allow the zooming functionality describe above.

When a specific type of malicious traffic is detected, that is, a specific type of attack, the defense coordination element 23 is alerted. In response, defense coordination element 23 registers the necessary filter-rules in the classifier/filter element 12' and invokes the necessary elements to sieve out the type of attack detected.

Control and management element 22' provides among others the following functions: it receives the information coming from the management application (that resides e.g. in the NOC) over the private out-of-band channel and/or the secure channel that arrives over the normal communication channel and places the received information in the appropriate element. These data could be for example: (i) customer profiles to be places in customer profiles database element 20', (ii) configurations and instructions to the defense coordination element 23, telling it to perform certain types of sieving, or (iii) initial or a new set of filter-rules that should be used by the classifier/filter to block and or direct certain types of traffic to appropriated elements.

DNS element 16 receives the DNS packets following the detection of a DNS attack. This element sieves out DNS requests and replies to statistically identify the malicious sources.

UDP element 13 receives the UDP packets following the detection of a UDP attack. This element sieves out UDP packets, only when a UDP attack is identified, by checking that each UDP packet is between a source and a victim for which a valid connection was established by the syn-defender/anti-spoofing element 14'.

Syn-defender/anti-spoofing element 14' works in the same way as function 14 in FIG. 2 does.

TCP element 15 receives the TCP packets except to those forwarded by the classifier/filter to the syn-defender element 14'. The TCP element checks each such packet to verify that a valid connection with the same source and destination IP addresses is established. Thus in effect making sure that the only TCP packets forwarded to the victim belong to a connection that passed the anti-spoofing verification step (performed by element 14').

/dev/null element 11 receives the packets that should be discarded from the classifier/filter element 12'. The only purpose of this element is to facilitate the collection of statistical data on the discarded packets, as required by the statistics collection element that needs it in turn for the termination detection and possibly for the intelligent learning control element.

De-multiplex element 24 receives the non-spoofed TCP packets and forwards them to different elements as determined by defense coordination element 23. For example, if a flash-crowd situation is detected, then the defense coordination element 23 instructs the de-multiplex element 24 to forward all the HTTP/TCP packets (port 80) to the HTTP cache proxy that was attached to the guard (if one is attached). In another example, all the TCP SYNACK packets that are generated by the syn-defender element 14' are directly sent to the NIC for transmission without going through the WFQ element 28 (since only traffic forwarded to the victim should go through the WFQ element).

HTTP proxy 36 represents a customer-supplied (e.g., ISP-supplied) module that provides the reverse web cache proxy functionality in case a flash-crowd situation is identified. In such a case the HTTP request traffic is diverted to the cache proxy 36 that services the requests on behalf of the victim. It is up to the customer to supply the appropriate cache proxy that can support the type and volume of HTTP requests that are expected under these circumstances.

WFQ element 28 controls access rate to the victim, using fair access rate to all the clients. The idea is to use a weight for each queue that could for example correspond to clients or source IP addresses, or any other traffic classification parameters, such as port numbers, and/or protocol types. Each queue weight is proportional to the estimate of traffic from each such source (client) and/or desired quality of service. A malicious client that attacks (or a legitimate client that is making too many requests), and hence is applying a larger than expected volume on the victim, would be throttled by the WFQ, and thus limiting the effect it applies on the access rate of other legitimate clients. Default settings for the WFQ indicate which sources (IP addresses) should get a larger relative share of the victim bandwidth, and default settings of the throttling levels are a function of the victim available bandwidth and the relative amount of it that should pass through this guard. In addition to a queue for each source IP address that communicates with the victim, the illustrated WFQ element can provide one or more queues of each of the UDP packets and the DNS requests among other types of flows.

A still more complete understanding of the operation of guards 10, 10' may be attained by reference to the discussion that follows.

TCP Anti-Spoofing

The traffic generated by DDoS attacks may be categorized in different ways, one of which is into two types: spoofed and not spoofed. In the spoofed packets, the source IP address is made up and is not the real source address of the machine from which the packet originates. In later sections mechanisms for dealing with the non-spoofed flows of packets are addressed. Here, we describe how the spoofed (masqueraded) packets are identified and blocked by guard machines of the type illustrated in FIGS. 2 and 3.

The spoofed packets may be of different types, such as, ping packets, other ICMP types, SYN packets from the first phase of TCP handshake, or other TCP or UDP packets. During an attack, the guard machine 10, 10' analyzes only the packets that are directly necessary for the service provided by the target of the attack (the victim). Assuming that the service is web service (HTTP based) all other packets such as UDP, ICMP and others are discarded by the guard machines 10, 10'. If the service is different, such as a mail server, or IRCs, then the corresponding packets are passed and the others that are not necessary for the service are discarded.

Here we describe how the most popular and difficult to protect spoof SYN attacks are blocked using anti-spoofing techniques which are TCP oriented. As with the TCP intercept model originally described by Checkpoint and Cisco, the guard machines 10, 10' conduct a three-way hand shake with the client, and only after verifying that a real client is operating behind the claimed source IP address and source port number, the connection is established also with the victim. Thereafter the guard machine 10, 10' operates as a proxy (TCP proxy) between the client and the victim.

When a client wishes to open a TCP connection with a server, it sends a SYN request, notifying the server about its attempt to open a new connection. The server authenticates the client source address by sending the client a random number (also used as the initial sequence number for the flow of packets). Then, the server waits to receive this number back from the source. Being spoofed the SYNACK is sent to a non existing client which does not respond. In such a case the guard times out the connection and discards it (see FIGS. 4A-4B).

Figure 4A:
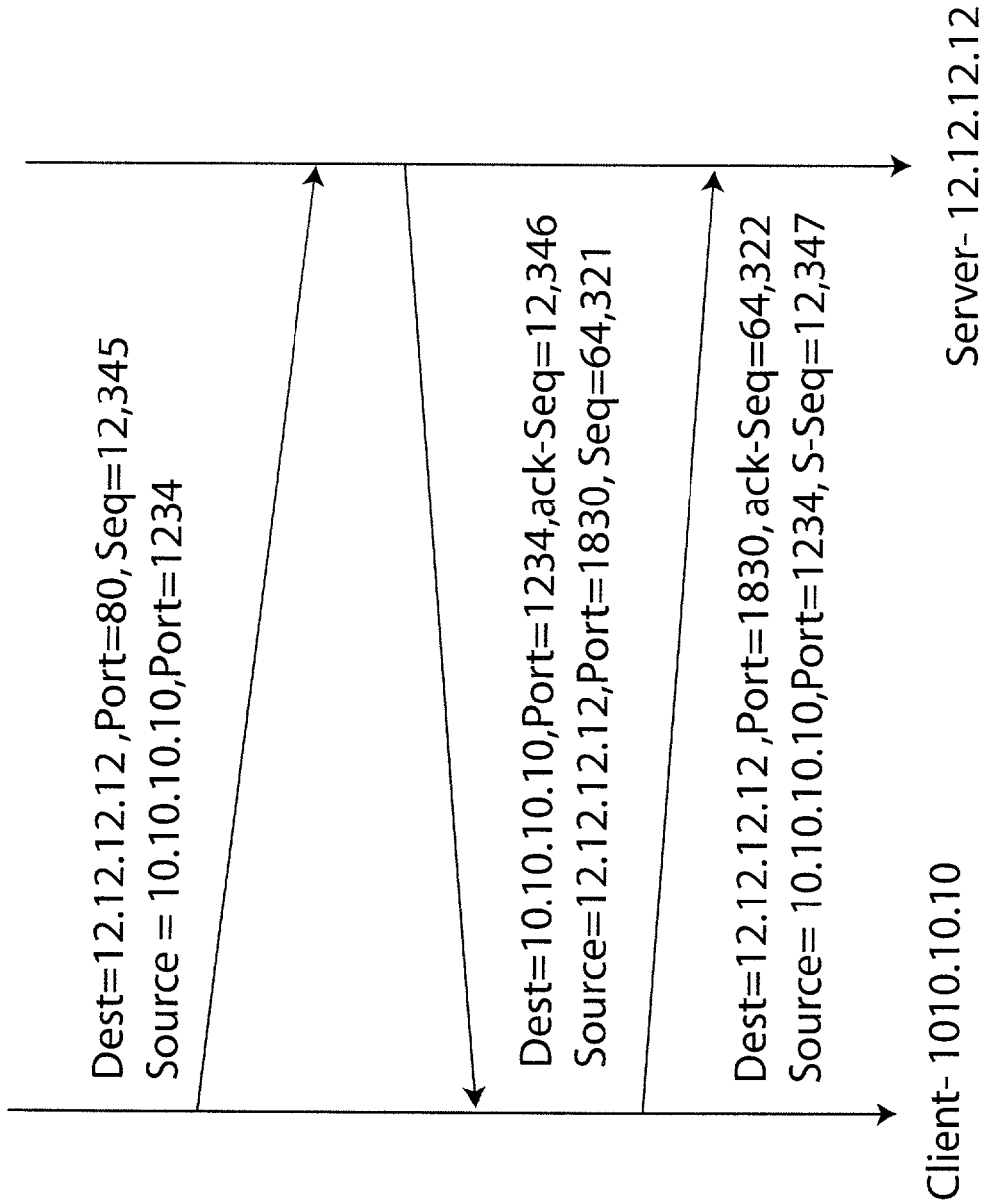
FIGS. 4a-4b depict sequence of messages during a three-way handshake for verification of a client.
Figure 4B:
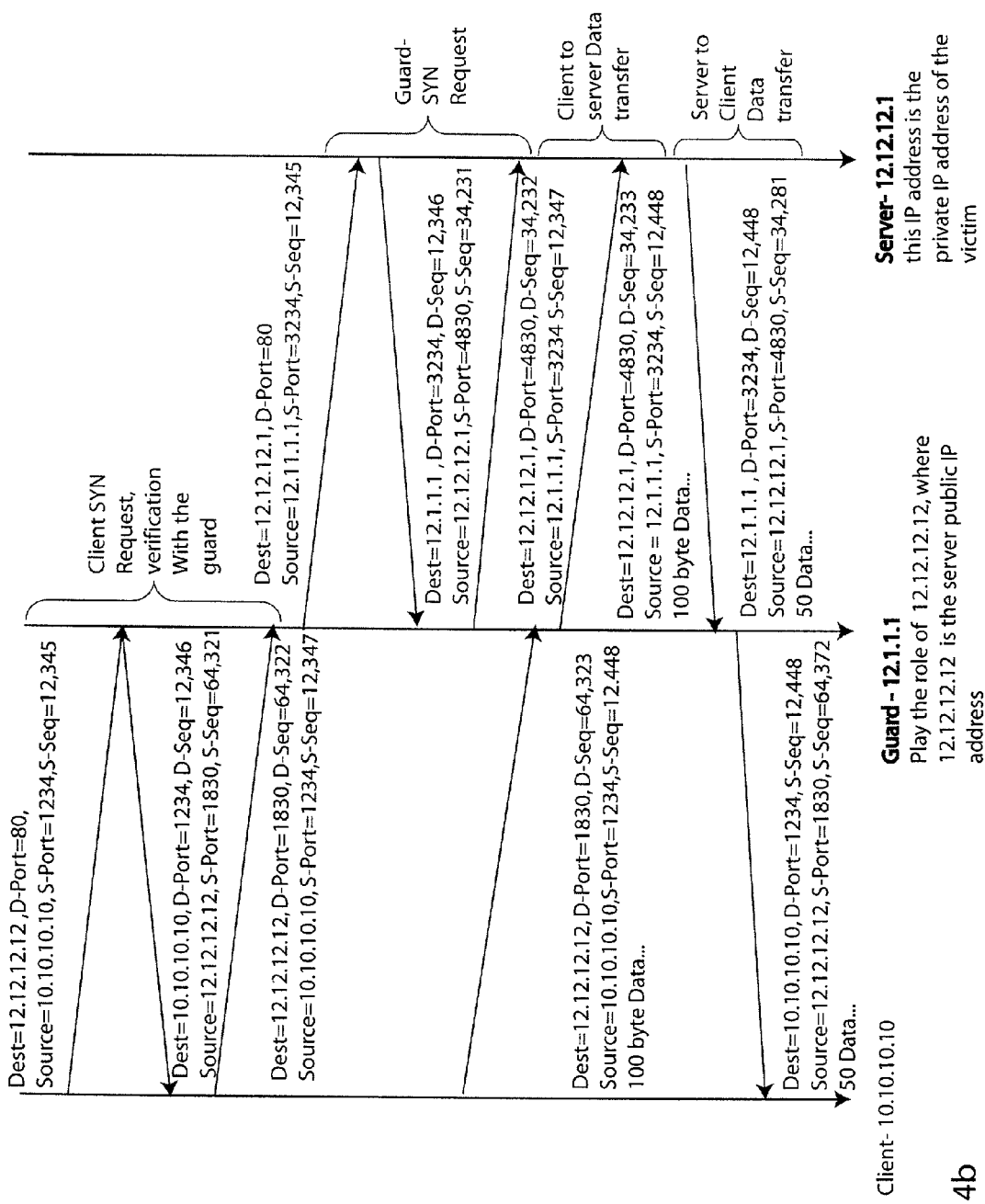

The SYN mechanism depicted in FIGS. 4A-4B for the connection establishment (three way handshake) is also one of the known denial of service attack methods. In this attack a huge number of spoofed SYN-requests are being sent to the server. Each such request must be buffered and kept by the server for a period of time (30 seconds by the standard) until its corresponding SYN-ACK is received. The SYN-request buffer at the server overfills which at worse brings the server down and at best causing the server to ignore good genuine requests to open new connections.

Each of the guard machines 10, 10' is a specially designed to handle a huge number of connection requests at very high speeds. Moreover, the distributed architecture of our system distributes the load among the different guard machines. FIGS. 4A-4B show the sequence of messages during the three way handshake. The first figure, FIG. 4A, shows the normal sequence of messages during the three way handshake between a client whose IP address is 12.12.12.12 and a server whose IP address is 10.10.10.10. In FIG. 4B, the same process is performed but now the SYN request message is intercepted by the guard machine which then performs the three-way handshake on behalf of the server. Only after the guard machine 10, 10' receives the correct SYN-ACK message from the client it opens the corresponding connection with the server and starts to function as a low level proxy between the client and the server.

Ingress Filtering

The guards of the illustrated system which are placed adjacent to routers help in ingress filtering by computing and instructing those routers R0-R9 which source IP addresses are suppose to arrive on each interface and which are not. The actual ingress filtering is performed by the routers (assuming the routers have the capability to filter according to the source IP address of packets on a long list of prefixes). This method is used both in normal operation and during an attack. At attack time the guards may thus employ the filtering mechanisms of the adjacent routers to block spoofed UDP or ICMP packets.

In the illustrated system, guards sitting around the ISP backbone learn the legitimate source IP addresses that may enter each of the router interfaces and instructs the router which sources to accept and which to deny. Notice that even though BGP routes are asymmetric and unstable, the majority of rules (of which sources to block and which to pass) are static and may be learned by assuming the symmetric characteristic of paths. However, since this is not always the case, and the illustrated system adapts and tracks the changes in the routings. To this end, it uses two techniques to gather the information necessary for the computation of the required knowledge (e.g., using a mechanism of the routers that give information of the incoming traffic such as Netflow):

1. Sampling the traffic that arrives on each interface in order to discover changes in the source addresses that are received over this interface.
2. Using ping (from the guard machines), to find out if the changes are legitimate, or a fake source IP address. In case of a spoofed address the answer to the ping is received on a different interface or on a different boarder router.

Attack Identification, Recognition and Isolation Via the Statistical Recognition Unit.

The statistical unit 16 monitors all the victim traffic that has passed the anti-spoofing authentication and was not stopped by the filter. The unit 16 samples and analyzes the traffic and identifies malicious sources (i.e., compromised sources), and provides operational rules for blocking the attack without disturbing innocent genuine traffic. The basic principle behind the unit's operation is that the pattern of traffic originating from a black-hat daemon residing at a source drastically differs from the pattern generated by such a source during normal operation. In contrast, traffic patterns of "innocent" (un-compromised) sources during an attack resemble their traffic at normal times. This principle is used to identify the attack type and source and provides guidelines for either the blockage by either the filter or other modules in the guard or further analysis of the suspected flows by refined monitoring by the statistical unit. For example, the statistical unit could decide that there is a UDP flood attack following which a more refined monitoring by the statistical unit would reveal that the UDP flood attack is on port 666 from a set of source IP addresses. Parameters that the statistical unit monitors in the stream of packets may include but are not limited to: the volume of a traffic from an attacking daemon, the distribution of packet sizes, port numbers, the distribution of the packets inter arrival times, number of concurrent flows, higher level protocol characteristics and the ratio of inbound and outbound traffic are all parameters that may indicate that a source (client) is an attacking daemon. The statistical unit 16 has two major tasks:

1) Learning the traffic patterns during normal operation, i.e., when no attack is being mounted. These patterns are used while defending a victim during an attack to compare with the actual traffic in order to distinguish the malicious traffic from genuine traffic. We consider three possible ways in which this learning can be done: (1) Using the routers NetFlow data, (2) Analyzing the server logs at the victim server, and (3) Analyzing the potential victim traffic at the guard by having the traffic diverted to the guard from time to time for randomly sampling it.

2) Monitoring the victim traffic during an attack to identify and isolate the malicious traffic from the good genuine traffic. The identity of the attacking host is then given to the filter or the neighboring routers that would then drop any packet arriving from that host.

Network Flows and Traffic Classification

The basic element studied by the statistical unit 16 is a flow. Each flow is a sequence of packets belonging to the same connection. In the most general way a flow is identified by the following parameters: Source IP address, Source port, Destination port, Protocol type, time of day and day of week of connection creation. The destination IP address is implied since all the information is collected per destination address. For each such flow the traffic volume is registered.

Keeping all of the above information is infeasible since it requires an unacceptable amount of memory. However learning methods are employed to identify the basic characteristics of the traffic destined to each destination and keep these key parameters succinctly, in an efficient way. Essentially the learning method studies the typical behavior of groups of users that interact with the destination. For example, a typical web site is accessed either by individual users sitting behind a host (pc), by a group of users sharing one multi user time sharing host, or by a group of users sitting behind a proxy. For each such group its typical behavior is studied. Other types of users are possible such as web crawlers (for search engines) and monitoring servers such as keynote (www.keynote.com). Furthermore, for the largest group, i.e. the group of individual users, their identities (IP address) is not kept. Each source which is not included in the other groups is assumed to be an individual source. On the other hand, for the group of proxy machines that access the destination, the individual IP address of each is kept in a tree like data-structure. For other groups of users only their IP address may be needed since their traffic would be blocked from the beginning during an attack. Henceforth, the rest of this section considers types of users and the characteristic of flows originating from such users.

The basic parameters characterizing each user group are:
1. Traffic volume distribution: These include the mean, median, peak and variance of the traffic such a user generates.
2. Port numbers distribution: Source port number distribution, and destination port number distribution.
3. Periodicity: Sources are examined for the periodicity of their requests. It is likely that malicious sources act in a relatively periodic manner, while innocent sources act not in a regular manner.
4. Packet Properties: The distribution of packet sizes, port numbers and other properties characterizing different attacks (known and new ones).
5. Protocol specific characteristics: for example http error rate and refresh rate.

Below is a more detailed list of candidates parameter that characterize a client:
1. Traffic Volume: Requests and return bandwidth. The traffic Volume, may be characteristic by leaky buckets, or by using exponential average ($T_i = (1-a)T_{i-1} + a\, d_i$).)
2. Inter Arrival time.
3. Session length and variance
4. Quit time
5. Request order (http level)
6. Percent of erroneous requests.
7. Percent of refresh request and percent of if modified since requests.
8. Time and date.
9. Geographies information.

10. Subnets information.
11. The history of IP (is this IP in the black list).
12. The length of the client's queue in the WFQ.
13. Is this clients have a legitimate cookie (in the site level).
14. The percents of a CPU consuming requests: (search, asp, cgi, encryption).
15. Learning Traffic Characteristics The averages in the above parameters can be computes using standard averaging techniques such as exponential average, running average, average in a window of time, etc. There are three possible ways to learn and analyze the traffic characteristics of a particular target:

1. Sampling a fraction of the packets ($\alpha$ in $(0,1)$) traversing the lines on route to the target and then classifying the packets according to the flow id and time of day and day of week. Notice that setting $\alpha=1$ requires the unit to process every packet and thus imposes high load on it while providing the best statistical measure. Lower values of a reduce the load posed on the unit while potentially somewhat degrading the statistical measure. The fraction, therefore, is a parameter that is set so that enough statistical knowledge can be gained without over-loading the system.

Some practical ways for sampling include duplicating traffic to the guard machines and (using special switching mechanism or special capabilities of routers for duplicating the traffic); redirecting the traffic by operating guard machines as if there is attacks on the site, for some small periodic time in the day; and putting a special machine that monitoring the traffic in the site.

2. Utilizing server logs collected by the defended target. These typically contain information about the activity being applied on the target. For example, WEB sites, which are likely to form the main body of potential targets, keep logs that record all the document requests sent to the site (including their source address, time of the day and other parameters). Processing of these logs by the illustrated system yields a very accurate measure of the statistics of network flow volumes (measured in packets per second, as in a) above). The potential draw backs of this method are first that being collected at the target it is not immediately clear which information is relevant to which guarding point, and second, the pattern seen by the target may be slightly different from the pattern seen at the network boarder. However neither is a real problem and the first one may be a feature, since network routes change and the traffic may enter the network from a different point during an attack.

3. Analyzing netflow data collected from the appropriated routers. This option requires the backbone provider to enable netflow and process it with our learning applications. This method has some limitation but none seems prohibitory. The limitations are that netflow aggregates information for each flow in intervals of a few minutes (typically 5 minutes intervals), and in this intervals it does not maintain the sizes of individual packets. Rather, it counts the total number of packets and bytes passed in this interval for each flow. Another limitation of netflow is that the ISP has to be more involved in acquiring the data. In particular most Cisco routers would send netflow data only to one destination. Thus the data would have to come from the ISP and not directly from the router.

Traffic Monitoring and Analysis at Attack Time

In an attack or overload condition, the guard machine defends a victim it monitors the victim traffic, classifies its traffic (incoming and outgoing) and compares the traffic to the normal traffic in order to detect the malicious traffic. Notice that during an attack information is collected only on the current flows. The information about well behaving flows is not kept more than small number of minutes.

1. Online traffic volume collection at attack time: This module collects the statistics of the traffic destined to the target(s) in attack time. Notice that in this sense, its measures are similar to the measures collected in approach 1 above. The classification of the traffic, in general, is similar to that conducted in the learning phase but may be controlled/guided by external intervention. Such intervention is enacted if some additional knowledge on the attack type is gained from other sources (e.g., human-aided identification) and can be utilized by the unit.

2. Attack Analysis: The traffic characteristics collected in the previous step are compared with the characteristics learned during normal operation to discover the malicious sources. The identified sources of malicious traffic are then blocked by the filter components of each guard. The output of this step is a sequence of rules instructing the filter which flows to block. Each such rule has two parameters:
   a. Network flow, identified by a combination of source IP address (can be prefixed), destination IP address (may be one or more), destination port number, protocol type (one may consider blockage that disregards port numbers, i.e., all the traffic originating from a compromised IP address, be it a proxy or a host).
   b. Duration, identifying the duration for which that class is blocked.

The analysis is based on the statistical parameters of the data and aims at keeping the target traffic at normal loads by blocking the most "suspicious" and "harmful" traffic streams. Blocking rules are based on maximizing the likelihood of blocking harmful traffic while minimizing the likelihood of blocking innocent traffic.

Statistical Recognition of Data "Innocence"

The guard machines uses two major properties of network flows to identify malicious traffic: a) Traffic pattern, and b) Traffic volume. Below we describe the recognition approaches based on these factors.

Recognition of Traffic Pattern

Several aspects of traffic pattern are examined:

1) Source "IP geography" proximity: Sources are classified into classes that resemble the "IP geography", that is IP addresses that reside on neighboring networks (using IP address prefix) are classified in the same class. A class that generates a relatively large volume of requests is suspected as being malicious. Notice, that such "malicious classes" are likely to form if the attacker planted a collection of daemons in the same network, and this network does not use a proxy.

2) Periodicity: Sources are examined for the distribution of packet inter-arrival times. It is expected that the inter-arrival times distribution of a malicious daemon is different than the inter-arrival times distribution of an innocent source (user or proxy). For example, it is likely that malicious sources act in a relatively periodic manner, while innocent sources act in more irregular pattern.

3) Packet Properties: Sources are examined for repetitive properties of their packets. For example the distribution of packet size. It is likely that malicious sources generate packets of identical properties (e.g.—all packets of same size) while innocent sources generate packets of more random nature. Other properties include port number distributions. Blockage of sources is done sequentially until the total volume of unblocked sources is below the traffic volume that can be sustained by the target server. In the distributed, illustrated system this threshold may depend on the load at other guards. A distributed algorithm is used to coordinate these thresholds between the different guard machines.

4) Protocol Specific properties: depends on the protocol such as http(error and refresh rate) DNS (error rate) etc.

Recognition of Traffic Volume

Traffic volume recognition is used to identify malicious sources that transmit large volumes of data that significantly differ from their normal volume. Specifically, Internet data sources are classified as either small sources or large sources. The former relates to individual IP addresses whose traffic volume is normally tiny. The latter relates to Proxy traffic or Spider (Crawler) traffic whose volume is drastically higher. (The traffic volume resulting from a Spider access is normally higher than that of a single human user, especially on large WEB sites. The reason is that a spider scans the whole site, leading to hundred or thousands of requests while a human client requests tens of pages or less, on average.)

The illustrated system keeps individual volume parameters for each of the large sources (e.g., proxies such as the AOL proxies and other edu and large companies proxies). Individual parameters are not kept for the small sources (representing individual clients); rather one set of parameters characterizing the mean, median and variance of typical users of the target server. At attack time the traffic volumes of individual flows is measured and compared to their recorded volume. Flows whose volume drastically differs (upwards) from their recorded measure are marked as being malicious.

The mathematical formulation of this procedure can be done for example as follows: Given are K classes of flows, indexed 1, 2, . . . , K, and characterized by the mean ($\mu_i$) and the variance ($\sigma_i$) of their learned volume, and by their current volume ($X_i$). We would like to identify the classes with the largest deviation from their corresponding expected volume. Let $Y_i = (X_i - \mu_i)/\sigma_i$. The illustrated system sorts the classes by the value of $Y_i$ and recommend blocking the classes with the largest values of $Y_i$. If the variance, $\sigma_i$, is relatively large (which could happen with Internet traffic) then $Y_i$ is set to $M_i$ (the median) times some constant $\alpha$ a design parameter that depends on the total traffic volume and the target server capacity.

Time Accumulating Traffic Volume Recognition and "Controlled" Denial of Service

The effectiveness of volume recognition increases with the time duration along which it is implemented. This is correct since the variance of total data volume generated by a source during a period of duration T decreases in T. For example, it is expected that the average amount of traffic generated by a small source during a period of 1 hour is very small. However, at certain epochs, it is expected that the average amount of traffic generated by the same source during a period of 1 minute can be rather large. (up to 60 times larger than that of the 1 hour average).

For this reason the following unique recognition and traffic screening mechanism is implemented in illustrated system. For source i, let $S_i(t)$ denote the amount traffic generated by the source during the interval (0,t) (where we assume that the attack starts at time 0). We then set at time t: $X_i(t) = S_i(t)/t$ and apply the above screening mechanism. An alternative way of computing the average is using exponential average of the inter arrival time. Let $d_j$ be the inter arrival time between the j-th packet and the (j−1) packet of source I, then the exponential average is $T_i = (1-a)T_{i-1} + a\, d_i$ This mechanism has the following properties:

1. For a small value of t (that is, at the first few seconds of the attack) a sophisticated and powerful attacker might cause some innocent users denial of service. This is due to the fact that the attacker may generate traffic that at the very beginning looks like an innocent client, and thus the attacker is not distinguishable from the innocent client. If at this stage the number of daemons is huge then the illustrated system may block some innocent clients and some attackers in order to ensure that the total volume is below the maximum allowed at the target server. Using this action, for a short period of time, some innocent clients may be denied of service but the illustrated system protects the site from going down (at which point all clients are denied service).

2. As t increases more and more malicious sources are identified and blocked and fewer innocent sources are blocked. This is since the malicious sources have posed large amount of accumulated load. Thus as time progresses less and less innocent clients are denied service. In fact, after a relatively short period of time all malicious sources are denied service while the innocent sources receive full regular service.

EXAMPLE

Consider the traffic volume generated on the Web site of the Nagano server (February 98). It had 11,665,713 requests made over a period of 24 hours by 59,582 clients. This means that a user requests 200 pages on average per session. Assuming uniform distribution of clients over the day, and that a user session spans about 10 minutes, on average, we get that the site supports 400 concurrent users on average. Since traffic is not uniform over the day we assume that the normal traffic reaches 2-3 times the daily average (at least), that is about 1000 concurrent users. For a hacker to overload the site twice the maximum load (i.e., by 100%) it is required to place an extra 1000 concurrent users. Assume that the attacker uses 200 daemons, each of them must generate traffic 5 times as high as that of the normal user, that is, on average 100 pages per minute (instead of 20 pages per minute).

Now, consider how the illustrated system operates to screen the malicious sources from the innocent ones. One minute after starting to defend, most malicious sources generate about 100 page requests. In contrast, the innocent sources generate about 20 pages; due to statistical fluctuations some of the innocent sources may generate more traffic, say 40 requests, but very few (if any!) will generate about 100 requests. For this reason, after one minute the illustrated system conducts the right screening with the likelihood of mistakenly blocking an innocent user being very small.

Description of the Protection Mechanism

The protection and detection would be done in a layered way. For example when we consider a UDP volume attack. At the first step we will try to estimate the total volume of UDP packets. Once we decide that this volume is above a certain threshold, we will spawn a few defenses.

For example: (1) estimate the volume per destination port (2) the volume per source IP, etc. Assume that we recognize that most of the volume is to port 53 (DNS protocol). In such a case we will invoke defenses which are specific to the DNS. The general idea is that rather than having all the defenses active at all times, invoke the defenses only when it seems like they are relevant.

Non-Attack Scenarios and Processing of Diverted Traffic

In addition to, or instead of, filtering malicious traffic for a victim V under a DDoS attack, the guard machines can be employed to protect the victim from overload under any variety of other circumstances, e.g., if the node is simply overwhelmed due to over-popularity or inadequate resources. Such overload conditions can be signaled by the victim in the manner described above as with DDoS attack, e.g., by sending authenticated messages to the NOC whence they are relayed to the guards (SNMP or out of band communication may be used instead).

The alert message contains the identity of the victim machines, (which includes their IP addresses). At this point the victim enters the "protected" mode.

Described above are system, devices and methods that achieve the desired objects. Those skilled in the art will appreciate that these are merely embodiments of the invention and that other embodiments, incorporating changes in those depicted here, fall within the scope of the invention. Thus, by way of example, it will be appreciated that guard machines incorporating less, more and/or different element than those describe above in connection with FIGS. 1A and 1B, as well as incorporating less, more and/or different interconnection between such elements, fall within the scope of the invention. By way of further example, it will be appreciated that the invention can be applied to networks (IP and otherwise) other than then the Internet. By way of further example, it will be appreciated that the guard node functionality can be implemented in software, firmware or hardware on any variety of platforms. By way of still further example, it will be appreciated that the invention can be applied for purposes of protecting victims from any overload condition on the Internet (or other network), not just those resulting from DDoS attacks.

In view of the foregoing, What we claim is:

1. A method of responding to an overload condition at a network element ("victim") in a set of one or more potential victims on a network, the method comprising the steps of:
   A. responsively to an indication of an anomalous traffic condition, initiating diversion of traffic destined for the victim by a first set of one or more network elements external to the set of one or more potential victims to a second set of one or more network elements external to the set of one or more potential victims,
   B. the element(s) of the second set filtering traffic diverted in step A ("diverted traffic") and selectively passing a portion thereof to the victim,
   wherein said filtering step includes detecting any of (i) a traffic pattern that differs from an expected pattern and (ii) traffic volume that differs from an expected volume, said expected pattern and said expected volume being determined during a period in which the victim is not at an overload condition, and
   wherein said detecting step includes determining whether any of the traffic pattern and volume varies statistically significantly from any of the expected pattern and volume, respectively.

2. A method according to claim 1, wherein the initiating step includes effecting a path of traffic that differs from a path that traffic would otherwise take to the victim.

3. A method according to claim 1, wherein the filtering step includes detecting suspected malicious traffic.

4. A method according to claim 3, wherein the detecting step includes detecting packets with spoofed source addresses.

5. A method according to claim 4, wherein detecting the packets with spoofed source addresses comprises executing a verification protocol with sources of the diverted traffic, and wherein the passing step includes passing to the victim traffic from a source that correctly complies with the verification protocol.

6. A method according to claim 1, wherein the filtering step includes detecting traffic requiring a selected service from the victim.

7. A method according to claim 6, wherein the filtering step includes discarding traffic not requiring the selected service from the victim.

8. A method according to claim 7, wherein the filtering step includes discarding any of UDP and ICMP packet traffic.

9. A method according to claim 1, comprising operating one or more elements of the first set at points on the network around the set of one or more potential victims.

10. A method according to claim 9, comprising operating one or more elements of the second set any of adjacent to or external to one or more elements of the first set.

11. A method according to claim 9, wherein the anomalous traffic condition is indicative of a distributed denial of service (DDoS) attack.

12. A method according to claim 9, comprising selectively activating the one or more elements of the first set by declaring a network address of the victim to be close in network distance to one or more elements of the second set.

13. A method according to claim 9, comprising associating the victim with first and second addresses, and wherein the filtering step includes
   discarding traffic received external to an area defined by the points directed to the first address, and
   passing to the victim traffic received external to an area directed to the second address.

14. A method according to claim 9, wherein the diverting step includes redirecting traffic using Policy Based Routing.

15. A method according to claim 1, wherein the filtering step includes statistically measuring any of a traffic pattern and volume so as to identify any of a source and a type of the overload condition.

16. A method according to claim 15, comprising determining any of the traffic pattern and volume during a period when the victim is not in the overload condition, for comparison with any of the traffic pattern and volume in the filtering step upon detecting the anomalous traffic condition.

17. A network element for use in protecting against an overload condition on a network, the network element comprising:
   an input for receiving traffic diverted from the network, the traffic comprising flows of data packets having respective source addresses;
   a statistics module that is arranged to perform a statistical analysis of the diverted traffic so as to detect an anomalous pattern of a flow associated with at least one of the source addresses;
   a filter, which is operative, responsively to detection of the anomalous pattern, to block at least a portion of the data packets having the at least one of the source addresses; and
   an output coupled to the input for selectively passing on to further elements in the network traffic not blocked by the filter,
   wherein said statistical analysis comprises detecting any of (i) a traffic pattern that differs from an expected pattern and (ii) traffic volume that differs from an expected volume, said expected pattern and said expected volume being determined during a period in which the victim is not at an overload condition, and determining whether any of the traffic pattern and volume varies statistically significantly from any of the expected pattern and volume, respectively.

18. A network element according to claim 17, comprising a termination detection module that at least participates in determining when the overload condition has ended.

19. A network element according to claim 17, comprising an antispoofing element that performs at least one of authenticating and verifying a source of traffic.

20. A system for use in protecting against an overload condition on a network, the system comprising:
one or more network elements ("guards") disposed on the network, each network element having
an input for receiving traffic from the network,
a filter coupled to the input, the filter selectively blocking traffic originating from a source suspected as potentially causing the overload condition,
a statistics module that is coupled to the filter and that identifies the traffic statistically indicative of having originated from the source suspected as potentially causing the overload condition, and
an output coupled to the input for selectively passing on to further elements in the network traffic not blocked by the filter,
one or more further network elements ("diverters") disposed on the network and in communication with the guards, the further network elements selectively initiating, responsively to detection of an anomalous traffic condition, diversion to at least one of the guards traffic otherwise destined for a still further network element ("victim") in a set of one or more potential victims on the network,
wherein said statistics module performs statistical analysis comprising detecting any of (i) a traffic pattern that differs from an expected pattern and (ii) traffic volume that differs from an expected volume, said expected pattern and said expected volume being determined during a period in which the victim is not at an overload condition, and determining whether any of the traffic pattern and volume varies statistically significantly from any of the expected pattern and volume, respectively.

21. A system according to claim 20, wherein at least one of the guards comprises a termination detection module that at least participates in determining when the overload condition has ended.

22. A system according to claim 20, wherein at least one of the guards comprises an ingress filter, coupled to the statistics module, that generates and transmits to a further network element on the network rules for blocking traffic on the network.

23. A system according to claim 20, comprising an antispoofing element that any of authenticates and verifies a source of traffic.

24. A method according to claim 1, wherein diverting the traffic comprises diverting all of the traffic destined for the victim upon detecting the anomalous traffic condition.

25. A method according to claim 1, and comprising learning an expected pattern of the traffic while the victim is not under attack, wherein detecting the anomalous traffic condition comprises determining that the traffic differs significantly from the expected pattern.

26. A method of responding to an overload condition at a network element ("victim") in a set of one or more potential victims on a network, the method comprising the steps of:
A. responsively to an indication of an anomalous traffic condition, initiating diversion of traffic destined for the victim by a first set of one or more network elements external to the set of one or more potential victims to a second set of one or more network elements external to the set of one or more potential victims,
B. the element(s) of the second set filtering traffic diverted in step A ("diverted traffic") and selectively passing a portion thereof to the victim,
wherein the initiating step includes effecting a path of traffic that differs from a path that traffic would otherwise take to the victim,
wherein the first set of one or more network elements comprises network switches having respective ports, comprising at least one switch that is configured to route the traffic to the victim through a first port while the victim is not under attach, and wherein effecting the path comprises instructing the at least one switch to route the traffic destined for the victim through a second port, to which at least one of the network elements in the second set is coupled,
wherein said filtering step includes detecting any of (i) a traffic pattern that differs from an expected pattern and (ii) traffic volume that differs from an expected volume, said expected pattern and said expected volume being determined during a period in which the victim is not at an overload condition, and
wherein said detecting step includes determining whether any of the traffic pattern and volume varies statistically significantly from any of the expected pattern and volume, respectively.

27. A method of responding to an overload condition at a network element ("victim") in a set of one or more potential victims on a network, the method comprising:
diverting to a guard machine traffic destined for the victim, the traffic comprising flows of data packets having respective source addresses;
performing a statistical analysis of the diverted traffic at the guard machine so as to detect an anomalous pattern of a flow associated with at least one of the source addresses; and
responsively to detecting the anomalous pattern, preventing at least a portion of the data packets having the at least one of the source addresses from reaching the victim while passing to the victim at least some of the data packets from other source addresses,
wherein said performing step includes learning an expected traffic pattern of the flows while said victim is not under attack and is not in an overload condition, and detecting an attack by determining that the anomalous pattern differs statistically significantly from the expected traffic pattern.

28. A method according to claim 27, wherein performing the statistical analysis comprises detecting any of a traffic volume, port number distribution, periodicity of requests, packet properties, IP geography, and distribution of packet arrival/size.

29. A method according to claim 27, and comprising processing the diverted traffic so as to detect and discard the data packets that have one or more spoofed source addresses before performing the statistical analysis.

30. A method according to claim 29, wherein processing the diverted traffic comprises initiating a protocol handshake between the guard machine one or more of the source addresses in order to determine that the one or more of the source addresses are spoofed.

31. A method according to claim 27, wherein preventing at least the portion of the data packets comprises filtering out the diverted packets that have the at least one of the source addresses.

32. A method according to claim 31, wherein filtering out the diverted packets comprises discarding the diverted packets that have the at least one of the source addresses before performing the statistical analysis on the diverted traffic that remains after the discarding.

33. A method according to claim 32, and comprising processing the diverted traffic after discarding the diverted packets that have the at least one of the source addresses so as to detect and discard the data packets that have one or more spoofed source addresses before performing the statistical analysis.

34. A method according to claim 27, wherein performing the statistical analysis comprises at least one of analyzing one or more of netflow data, server logs, victim traffic, and traffic volume, and classifying the statistical analysis according to types of users that generated the traffic.

35. A method according to claim 27, wherein performing the statistical analysis comprises classifying the traffic according to types of users that generated it.

36. A method of responding to an overload condition at a network element ("victim") in a set of one or more potential victims on a network, the method comprising:
coupling the victim to receive traffic from the network via a first port of a network switch;
actuating the network switch to divert the traffic destined for the victim to a second port to which a guard machine is coupled;
filtering the diverted traffic using the guard machine; and
selectively passing at least a portion of the filtered traffic from the guard machine to the victim,
wherein said filtering comprises performing statistical analysis comprising detecting any of (i) a traffic pattern that differs from an expected pattern and (ii) traffic volume that differs from an expected volume, said expected pattern and said expected volume being determined during a period in which the victim is not at an overload condition, and determining whether any of the traffic pattern and volume varies statistically significantly from any of the expected pattern and volume, respectively.

37. A method according to claim 36, wherein the network switch comprises a router.

38. A method according to claim 36, wherein selectively passing at least the portion of the filtered traffic comprises passing the filtered traffic from the guard machine to the network switch, for transmission to the victim via the first port.

39. A method according to claim 36, wherein filtering the diverted traffic comprises performing a statistical analysis of the diverted traffic so as to detect an anomalous pattern of a flow associated with at least one source address of the traffic, and responsively to detecting the anomalous pattern, preventing at least a portion of the data packets having the at least one source address from reaching the victim.

* * * * *